United States Patent
Lee

(10) Patent No.: US 11,820,299 B2
(45) Date of Patent: Nov. 21, 2023

(54) REAR VIEW CAMERA FOR VEHICLE AND CONTROL METHOD THEREFOR

(71) Applicant: HYUNDAI MOBIS CO., LTD., Seoul (KR)

(72) Inventor: Won Moo Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 38 days.

(21) Appl. No.: 17/463,377

(22) Filed: Aug. 31, 2021

(65) Prior Publication Data

US 2022/0073011 A1 Mar. 10, 2022

(30) Foreign Application Priority Data

Sep. 10, 2020 (KR) .......................... 10-2020-0116043

(51) Int. Cl.
| | |
|---|---|
| *B60R 11/04* | (2006.01) |
| *G06F 3/041* | (2006.01) |
| *H04N 23/57* | (2023.01) |
| *B60R 11/00* | (2006.01) |

(52) U.S. Cl.
CPC ............ *B60R 11/04* (2013.01); *G06F 3/0416* (2013.01); *H04N 23/57* (2023.01); *B60R 2011/0036* (2013.01); *B60R 2300/806* (2013.01)

(58) Field of Classification Search
CPC ........... B60R 11/04; G06F 2203/04105; G06F 2203/04112

USPC .......................................................... 348/148
See application file for complete search history.

(56) References Cited

U.S. PATENT DOCUMENTS

| | | | |
|---|---|---|---|
| 10,009,522 B2 | 6/2018 | Park | |
| 10,398,204 B1* | 9/2019 | Morgan | ................ A45C 11/00 |
| 2011/0043325 A1* | 2/2011 | Newman | ................ E05F 15/46 |
| | | | 340/5.2 |
| 2016/0119518 A1* | 4/2016 | Park | ........................ B60R 11/04 |
| | | | 348/148 |
| 2021/0302536 A1* | 9/2021 | Casamassima | ......... H04W 4/48 |

FOREIGN PATENT DOCUMENTS

KR 10-1601512 3/2016

\* cited by examiner

*Primary Examiner* — Jeffery A Williams
(74) *Attorney, Agent, or Firm* — DLA PIPER LLP (US)

(57) ABSTRACT

According to at least one aspect, the present disclosure provides a rear view camera for a vehicle, comprising: a camera configured to photograph a rear region behind a vehicle; a protective cover configured to surround at least a portion of the camera; an outer cover that is coupled to the protective cover and provided to be exposed to the outside of the vehicle, the outer cover including a through-hole through which the camera is configured to photograph the rear region behind the vehicle; and a touch sensing unit configured to generate an electrical signal in response to detecting a touch on the outer cover by a user who possesses a smart key of the vehicle, wherein a trunk of the vehicle is opened in response to the electrical signal generated by the touch sensing unit.

12 Claims, 4 Drawing Sheets

(a)

(b)

REAR VIEW CAMERA FOR VEHICLE AND CONTROL METHOD THEREFOR

CROSS-REFERENCE TO RELATED APPLICATION

This application claims priority to and the benefit of Korean Patent Application No. 10-2020-0116043, filed on Sep. 10, 2020, the disclosure of which is incorporated herein by reference in its entirety.

BACKGROUND

Field of the Invention

The present disclosure relates to a rear view camera for a vehicle and a method of controlling the same. More specifically, the present disclosure relates to a rear view camera for a vehicle, which includes a part for opening a trunk of a vehicle, and a method of controlling the same.

Discussion of Related Art

The content described in this section merely provides background information about the present disclosure and does not constitute the related art.

As a part of reversing assistance and parking assistance systems for a vehicle, a rear view camera is installed at the rear of the vehicle. At the rear of the vehicle, a trunk switch for opening a trunk of the vehicle coexists with the rear view camera. For an exterior design of the vehicle, the rear view camera and the trunk switch are positioned close to each other. When the rear view camera and the trunk switch are separately manufactured and assembled, the number of parts and an assembling time thereof are increased.

In addition, since the rear view camera and the trunk switch occupy different mounting spaces, there is a disadvantage in that a degree of freedom in designing a trunk lid or a tailgate for the mounting space is reduced.

SUMMARY OF THE INVENTION

The present disclosure is directed to providing a rear view camera for a vehicle in which a trunk switch function of a vehicle is added in a rear view camera, thereby reducing the number of parts and material costs and increasing a degree of freedom in designing a rear exterior of the vehicle, and a method of controlling the same.

According to at least one aspect, the present disclosure provides a rear view camera for a vehicle, comprising: a camera configured to photograph a rear region behind a vehicle; a protective cover configured to surround at least a portion of the camera; an outer cover that is coupled to the protective cover and provided to be exposed to the outside of the vehicle, the outer cover including a through-hole through which the camera is configured to photograph the rear region behind the vehicle; and a touch sensing unit configured to generate an electrical signal in response to detecting a touch on the outer cover by a user who possesses a smart key of the vehicle, wherein a trunk of the vehicle is opened in response to the electrical signal generated by the touch sensing unit.

According to another aspect, the present disclosure provides a method of controlling a rear view camera for a vehicle, the method comprising: transmitting, by a smart key possessed by a user who approaches a vehicle, an approach signal to a control unit provided inside the vehicle; receiving, by the control unit, the approach signal; detecting a user's touch on an outer cover that is provided to be exposed to the outside of the vehicle, the outer cover including a through-hole through which a camera is configured to photograph a rear region behind the vehicle; in response to the detecting of the user's touch, generating, by a printed circuit board, an electrical signal under control of the control unit; and opening a trunk of the vehicle in response to the electrical signal, wherein the outer cover is coupled to a protective cover configured to surround at least a portion of the camera configured to photograph the rear region behind the vehicle.

REFERENCE NUMERICALS

Figure 1:
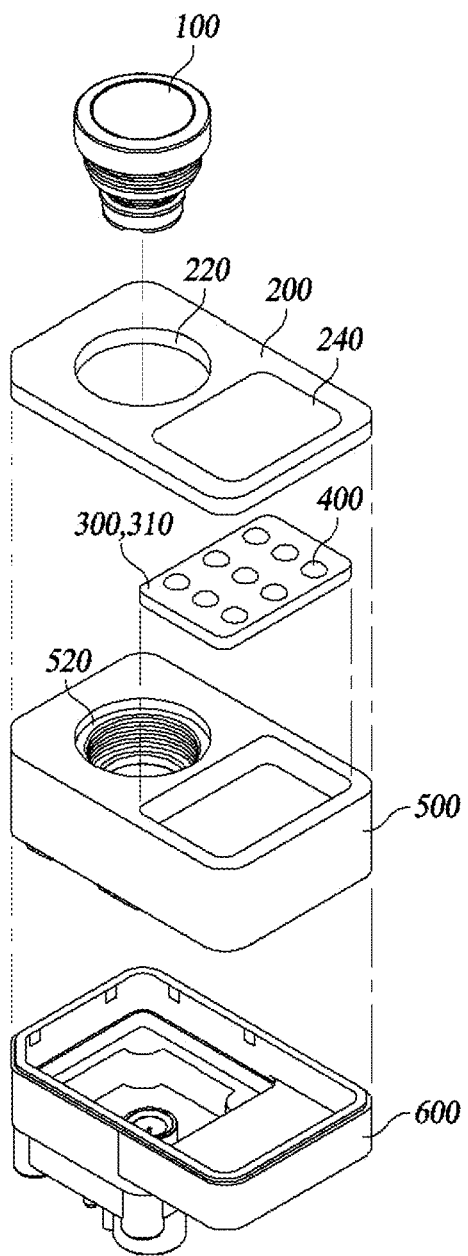
FIG. 1 is an exploded perspective view of a rear view camera for a vehicle according to one embodiment of the present disclosure.

100: camera
200: outer cover
220: fixing housing
240: touch sensing area
300: touch sensing unit
310: printed circuit board
320: transparent adhesive unit
330: transparent conductor
340: signal connection unit
350: camera board
360: image sensor
370: connector
400: light-emitting device
500: protective cover
520: receptacle groove
600: rear cover
700: smart key

DETAILED DESCRIPTION OF EMBODIMENTS

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is an exploded perspective view of a rear view camera for a vehicle according to one embodiment of the present disclosure.

Figure 2:
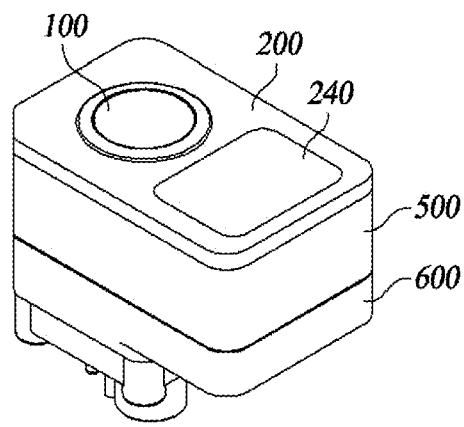
FIG. 2 is a perspective view of the rear view camera for a vehicle according to one embodiment of the present disclosure.

FIG. 2 is a perspective view of the rear view camera for a vehicle according to one embodiment of the present disclosure.

Figure 3:
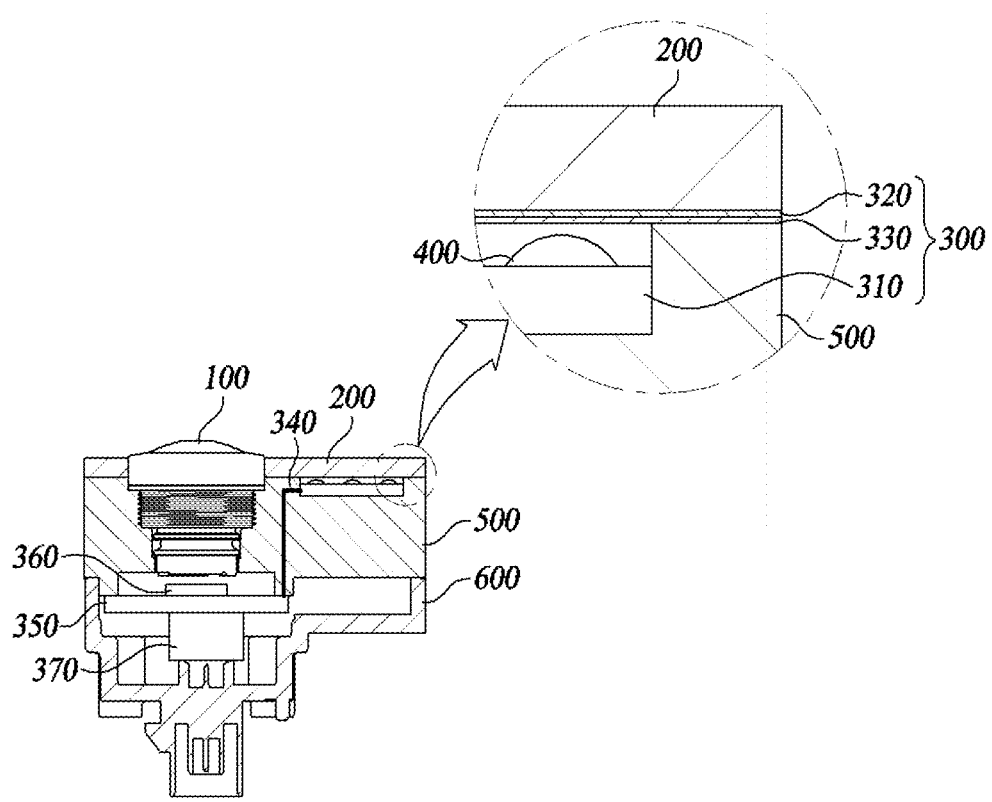
FIG. 3 shows cross-sectional views of the rear view camera for a vehicle according to one embodiment of the present disclosure.

FIG. 3 shows cross-sectional views of the rear view camera for a vehicle according to one embodiment of the present disclosure.

Referring to FIGS. 1 to 3, the rear view camera for a vehicle according to one embodiment of the present disclosure includes all or some of a camera 100, a protective cover 500, a rear cover 600, an outer cover 200, a touch sensing unit 300, and a light-emitting device 400.

The camera 100 is configured to photograph a rear region behind a vehicle. For example, the camera 100 may be positioned on a garnish positioned at the rear of the vehicle, that is, around a position at which a decorative part is provided. However, the camera 100 is not necessarily limited to the position, and as long as the camera 100 can serve to assist in parking the vehicle and serve to photograph a rear region behind the vehicle, the camera 100 may be positioned elsewhere in the vehicle.

The protective cover 500 surrounds at least a portion of the camera 100. Accordingly, the protective cover 500 may serve to protect the camera 100 from an external impact, and a receptacle groove 520 may be formed to safely seat the camera 100 while surrounding at least a portion of the camera 100. The receptacle groove 520 is not necessarily positioned at a center of the protective cover 500 and may be positioned in a region adjacent to one side of the protective cover 500.

The rear cover 600 accommodates at least a portion of a cable (not shown) and is coupled to a rear surface of the protective cover 500. Here, a front surface refers to a surface positioned toward the outside of the vehicle with respect to a trunk of the vehicle, and a rear surface refers to a surface positioned toward the interior of the vehicle with respect to the trunk of the vehicle. In addition, the cable may be configured to supply power to the camera 100. The cable may be provided as a coaxial cable, but the present disclosure is not necessarily limited thereto. Meanwhile, the rear cover 600 may include a connector 370 for connecting and fixing the cable.

A camera board 350, which is connected to the connector 370 and the cable and is configured to supply power to the camera 100 and to transmit and receive electrical signals, may be disposed inside the rear cover 600. Meanwhile, an image sensor 360 may be mounted on the camera board 350 to convert light passing through a lens into an electrical signal. Therefore, when the camera 100 photographs a rear region behind the vehicle, information about a captured image may be converted into an electrical signal by the image sensor 360, and the electrical signal may be transmitted to the cable using the camera board 350. A rear surface of the camera board 350 may be connected to the connector 370.

The outer cover 200 is coupled to the protective cover 500 and provided to be exposed to the outside of the vehicle. The outer cover 200 is formed as a hollow type such that a through-hole is formed at a position corresponding to a position at which the receptacle groove 520 of the protective cover 500 is formed. That is, the outer cover 200 may be exposed to the outside of the vehicle together with the camera 100, and since the outer cover 200 is exposed to the outside of the vehicle, a user of the vehicle may touch the outer cover 200. The outer cover 200 may be made of, for example, glass, polymethyl methacrylate (PMMA), polycarbonate (PC), or the like.

A touch sensing area 240 may be formed on a surface adjacent to one side of the outer cover 200. That is, the touch sensing area 240 is positioned on the surface adjacent to one side of the outer cover 200, and a portion of the camera 100 may be positioned on a surface adjacent to the other side of the outer cover 200.

The touch sensing unit 300 generates an electrical signal by detecting a touch on the outer cover 200 by a user who possesses a smart key of the vehicle. That is, when the user possessing the smart key touches the outer cover 200 using a part of his/her body, the touch sensing unit 300 may detect the touch to generate an electrical signal. When the touch sensing area 240 is formed on the surface adjacent to one side of the outer cover 200, the touch sensing unit 300 may generate an electrical signal by detecting a user's touch on the touch sensing area 240.

For example, the touch sensing unit 300 may have a capacitive touch screen structure and a structure which generates an electrical signal by detecting a change in current flowing in a conductor due to electric charges present on a body surface when a part of a human body touches the outer cover 200. However, the touch sensing unit 300 is not necessarily limited to the capacitive touch screen structure. For example, the touch sensing unit 300 may have a resistive touch screen structure, an infrared touch screen structure, a surface ultrasonic touch screen structure, or the like.

The touch sensing unit 300 detects a user's touch in such a manner to generate an electrical signal, and the trunk of the vehicle may be opened in response to the electrical signal. Hereinafter, as the capacitive touch screen structure, the configuration of the touch sensing unit 300 will be described in detail.

The touch sensing unit 300 includes all or some of a transparent conductor 330, a transparent adhesive unit 320, a printed circuit board 310, and a control unit (not shown).

The transparent conductor 330 is attached to a rear surface of the outer cover 200 and has conductivity. For example, the transparent conductor 330 may be formed of an indium tin oxide (ITO) film. The transparent conductor 330 is attached to the rear surface of the outer cover 200 and positioned inside the vehicle. In addition, since the transparent conductor 330 is configured to allow a current to flow therein, when a part of a human body touches the outer cover 200, a flow of the current is changed accordingly.

The transparent adhesive unit 320 is disposed between the outer cover 200 and the transparent conductor 330 to fix the outer cover 200 and the transparent conductor 330. In addition, when the transparent conductor 330 is formed in a two-layered structure and provided in a manner that directions of currents flowing in respective layers are orthogonal to each other, the transparent adhesive unit 320 may be disposed between the layers of the transparent conductor 330 to fix a plurality of transparent conductors 330.

The printed circuit board 310 may be configured to generate an electrical signal and apply a current to the transparent conductor 330. That is, the printed circuit board 310 may receive power from the cable and may apply a current to the transparent conductor 330 using the received power. In addition, the electrical signal generated by the printed circuit board 310 may be transmitted to a trunk driving unit (not shown) using the cable, and the trunk driving unit may be configured to receive the electrical signal and open the trunk.

Meanwhile, the printed circuit board 310 may be electrically connected to the camera board 350 using a signal connection unit 340. However, the printed circuit board 310 and the camera board 350 are not necessarily electrically connected using the signal connection unit 340, for example, a wire or the like, and the printed circuit board 310 and the camera board 350 may be formed in a structure of an integrally formed flexible printed circuit board. Accordingly, an electrical signal generated from the printed circuit board 310 may be transmitted to the cable using the camera board 350.

The control unit may include a controller for controlling an electrical signal generated by the printed circuit board 310 and a current applied by the printed circuit board 310. The control unit may be included in the printed circuit board 310, but the present disclosure is not necessarily limited thereto. The control unit detects a change in current generated by a user's touch on the outer cover 200 and controls the printed circuit board 310 to generate an electrical signal.

In addition, the control unit controls a current applied by the printed circuit board 310 by detecting that the user possessing the smart key of the vehicle approaches the vehicle. That is, an antenna may be provided inside each of the vehicle and the smart key, and the antennas may be configured to transmit and receive wireless signals in a preset frequency band, for example, a low frequency band of less than 300 MHz.

When the user approaches the vehicle and the antenna in the vehicle transmits and receives a signal to and from the antenna in the smart key, the smart key transmits an approach signal to the control unit. The control unit receives the approach signal to detect that the user possessing the smart key approaches the vehicle. When detecting that the user approaches the vehicle, the control unit controls the printed circuit board 310 to apply a current to the transparent conductor 330. Accordingly, when the user possessing the smart key approaches the vehicle, a current flows in the transparent conductor 330, and the user touches the outer cover 200. Thus, an electrical signal is generated, and the trunk is opened.

On the other hand, a trunk open button (not shown) may be separately provided in the smart key, and when the trunk open button is pressed, a trunk open signal may be transmitted directly to the control unit. The control unit receiving the trunk open signal may control an electrical signal generated by the printed circuit board 310 to open the trunk irrespective of a user's touch on the outer cover 200.

As described above, since the touch sensing unit 300 of the rear view camera for a vehicle according to one embodiment of the present disclosure includes all or some of the transparent conductor 330, the transparent adhesive unit 320, the printed circuit board 310, and the control unit, when the user possessing the smart key approaches the vehicle, an electrical signal may be generated using a user's touch on the outer cover 200.

The light-emitting device 400 is disposed at the rear surface of the transparent conductor 330 and is configured to emit light toward the outer cover 200. The light-emitting device 400 may be formed using, for example, a light-emitting diode (LED), but the present disclosure is not necessarily limited thereto. The light-emitting device 400 may be formed using a laser diode (LD).

The printed circuit board 310 is configured to apply a current to the light-emitting device 400. That is, when the control unit detects that the user approaches the vehicle, the control unit controls the printed circuit board 310 to apply a current to the light-emitting device 400. Therefore, when the user possessing the smart key approaches the vehicle, a current is applied to the light-emitting device 400, and the light-emitting device 400 emits light toward the outer cover 200.

In order to make the light emitted from the light-emitting device 400 visible from the outside of the vehicle, an optical pattern may be formed on a surface of the outer cover 200 using a laser etching process. That is, by forming a fine optical pattern on the surface of the outer cover 200, light generated from the light-emitting device 400 may be emitted to the outside of the outer cover 200, and the user approaching the vehicle may recognize light emitted from the outer cover 200.

Since a current is not applied to the light-emitting device 400 in a state in which the user does not approach the vehicle, light is not emitted from the outer cover 200. When the user approaches the vehicle with the smart key, a current is applied to the light-emitting device 400 so that the user can recognize the light emitted from the outer cover 200. Accordingly, the user can easily recognize an area to be touched even in the dark, and in particular, the visibility of the touch sensing area 240 can be improved.

Therefore, the rear view camera for a vehicle according to one embodiment of the present disclosure performs a trunk open switch function, and the touch sensing unit 300 is integrally formed with the camera 100, thereby reducing the number of parts and material costs as compared with a case in which a rear view camera and a trunk switch are separately manufactured.

Figure 4:
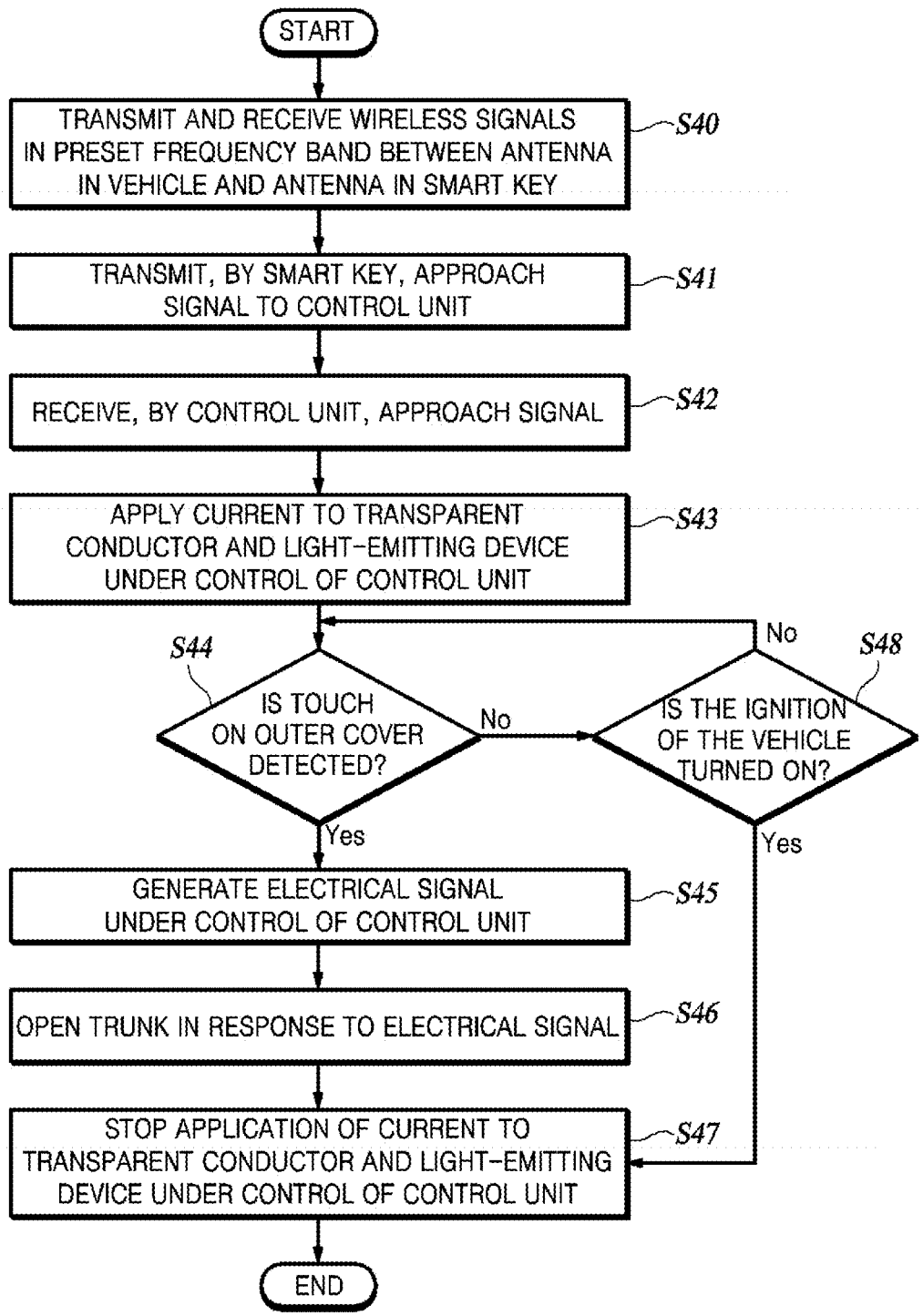
FIG. 4 is a flowchart illustrating a method of controlling a rear view camera for a vehicle according to one embodiment of the present disclosure.

FIG. 4 is a flowchart illustrating a method of controlling a rear view camera for a vehicle according to one embodiment of the present disclosure.

Referring to FIG. 4, when a smart key is positioned around a vehicle, wireless signals in a preset frequency band are transmitted and received between an antennal in the vehicle antenna and an antenna in the smart key (S40). For example, the antenna in the vehicle may continuously transmit an authentication request signal in a low frequency band, and the antenna in the smart key positioned around the vehicle may receive the authentication request signal and transmit an authentication response signal. When the smart key receives a wireless signal from the antenna in the vehicle, the smart key transmits an approach signal to a control unit (S41). The control unit receives the approach signal transmitted from the smart key (S42). A current is applied to a transparent conductor 330 and a light-emitting device 400 under control of the control unit receiving the approach signal (S43). That is, the control unit controls a printed circuit board 310 to apply a current to the transparent conductor 330 and the light-emitting device 400. When a current is applied to the transparent conductor 330 and the light-emitting device 400, a current flows in the transparent conductor 330, and the light-emitting device 400 emits light. Accordingly, a touch sensing area 240 emits light according to an optical pattern.

The control unit detects whether there is a touch on an outer cover 200 (S44). That is, the control unit detects whether a change in current has occurred due to a user's touch. When the touch on the outer cover 200 is detected, an electrical signal is generated under control of the control unit (S45). A trunk is opened in response to the generated electrical signal (S46). For example, the control unit may control the printed circuit board 310 to generate an electrical signal, the generated electrical signal may be transmitted to a trunk driving unit using a cable, and the trunk driving unit may be driven to open the trunk of the vehicle. When the trunk is opened, the application of a current to the transparent conductor 330 and the light-emitting device 400 is stopped under control of the control unit (S47).

When the touch on the outer cover 200 is not detected, the control unit determines whether an ignition of the vehicle is in an off state, that is, whether the ignition of the vehicle is turned on (S48). When it is determined that the ignition of the vehicle is in an off state, that is, the ignition of the vehicle is turned off, the control unit continues to detect a touch on the outer cover 200 (S44). On the other hand, when it is determined that the ignition of the vehicle is in an on state, the application of a current to the transparent conductor 330 and the light-emitting device 400 is stopped under control of the control unit (S47). This is to prevent unnecessary power consumption because, when the ignition of the vehicle is turned on without a touch on the outer cover 200, the user does not intend to open the trunk of the vehicle.

Figure 5:
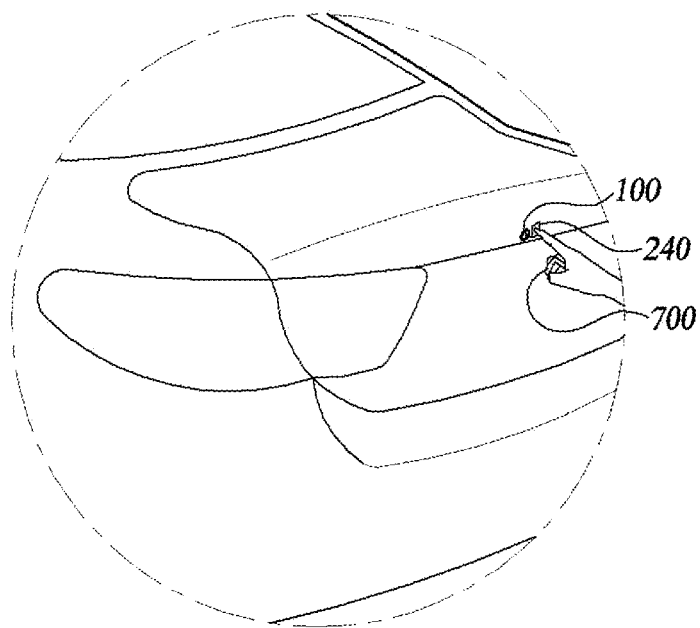
FIG. 5 shows views illustrating an example of operating a vehicle view rear camera according to one embodiment of the present disclosure.
Figure 5:
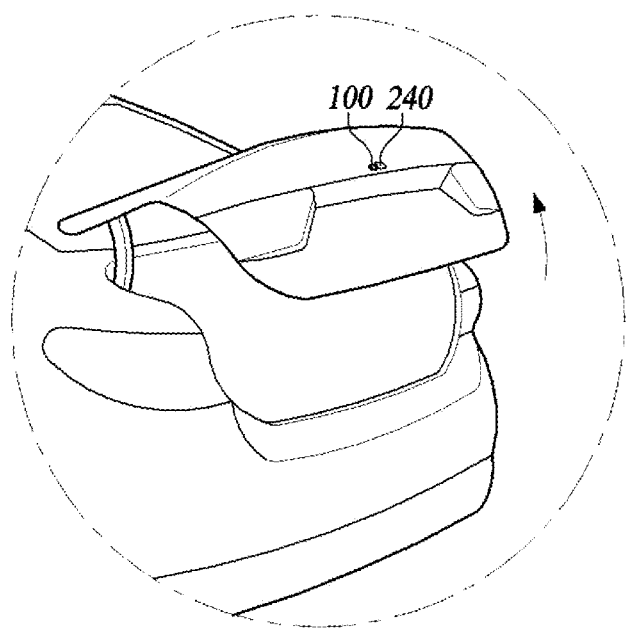

FIG. 5 shows views illustrating an example of operating a vehicle view rear camera according to one embodiment of the present disclosure.

Referring to FIG. 5, when a user of a vehicle currently has a smart key 700, a touch sensing area 240 of the rear view camera for a vehicle according to one embodiment of the present disclosure mounted on the rear of the vehicle is activated. In this state, when the user of the vehicle touches the touch sensing area 240, an electrical signal due to the touch is generated, and a trunk of the vehicle is opened in response to the electrical signal.

As described above, unlike an existing rear view camera and trunk open switch, in a rear view camera for a vehicle according to one embodiment of the present disclosure, since a camera 100 and a touch sensing unit 300 are integrally formed, a trunk switch function is added in the rear view camera, thereby reducing the total number of parts and material costs. In addition, the overall size of the parts can be reduced, thereby increasing a degree of freedom in designing a rear exterior of a vehicle.

As described above, according to the present embodiment, a trunk switch function of a vehicle is added in a rear view camera, thereby reducing the number of parts and material costs and increasing a degree of freedom in designing a rear exterior of the vehicle.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A rear view camera for a vehicle, comprising:
a camera configured to photograph a rear region behind a vehicle;
a protective cover configured to surround at least a portion of the camera;
an outer cover that is coupled to the protective cover and provided to be exposed to the outside of the vehicle, the outer cover including a through-hole through which the camera is configured to photograph the rear region behind the vehicle; and
a touch sensing unit configured to generate an electrical signal in response to detecting a touch on the outer cover by a user who possesses a smart key of the vehicle, the touch sensing unit including:
a transparent conductor which is attached to a rear surface of the outer cover and has conductivity;
a transparent adhesive disposed between the outer cover and the transparent conductor to fix the outer cover and the transparent conductor; and
a printed circuit board configured to generate the electrical signal and apply a current to the transparent conductor,
wherein a trunk of the vehicle is opened in response to the electrical signal generated by the touch sensing unit.

2. The rear view camera of claim 1, further comprising a light-emitting device disposed at a rear surface of the transparent conductor and configured to emit light toward the outer cover.

3. The rear view camera of claim 2, wherein the printed circuit board is configured to apply a current to the light-emitting device.

4. The rear view camera of claim 1, wherein the touch sensing unit further includes a control unit configured to control the electrical signal generated by the printed circuit board and the current applied by the printed circuit board.

5. The rear view camera of claim 4, wherein the control unit is configured to detect that the user possessing the smart key of the vehicle approaches the vehicle and control the current applied by the printed circuit board.

6. The rear view camera of claim 1, wherein an optical pattern is formed on a surface of the outer cover using a laser etching process.

7. The rear view camera of claim 1, further comprising:
a cable configured to supply power to the camera and the printed circuit board and transmit the electrical signal to a trunk driving unit configured to open the trunk; and
a rear cover configured to accommodate at least a portion of the cable and coupled to a rear surface of the protective cover.

8. A method of controlling a rear view camera for a vehicle, the method comprising:
transmitting, by a smart key possessed by a user who approaches a vehicle, an approach signal to a control unit provided inside the vehicle;
receiving, by the control unit, the approach signal;
after the receiving of the approach signal transmitted by the smart key, applying a current to a transparent conductor attached to a rear surface of an outer cover under control of the control unit;
detecting a user's touch on an outer cover that is provided to be exposed to the outside of the vehicle, the outer cover including a through-hole through which a camera is configured to photograph a rear region behind the vehicle;
in response to the detecting of the user's touch, generating, by a printed circuit board, an electrical signal under control of the control unit;
opening a trunk of the vehicle in response to the electrical signal; and
stopping, by the printed circuit board, the application of a current to a transparent conductor attached to a rear surface of the outer cover under control of the control unit, wherein the outer cover is coupled to a protective cover configured to surround at least a portion of the camera configured to photograph the rear region behind the vehicle.

9. The method of claim 8, further comprising, before the transmitting of the approach signal to the control unit provided inside the vehicle, transmitting and receiving a wireless signal in a preset frequency band between an antenna provided in the vehicle and an antenna provided in the smart key.

10. The method of claim 8, wherein the applying of the current to the transparent conductor attached to the rear surface of the outer cover under control of the control unit includes applying, by the printed circuit board, a current to a light-emitting device under control of the control unit, wherein the light-emitting device is disposed at a rear surface of the transparent conductor and is configured to emit light toward the outer cover.

11. The method of claim 8, further comprising:
after the detecting of the user's touch on the outer cover in a hollow type that is provided to be exposed to the outside of the vehicle,
in response to no longer detecting the user's touch, determining whether an ignition of the vehicle is turned on; and
in response to determining the ignition of the vehicle is turned on, stopping, by the printed circuit board, the applying of the current to the transparent conductor under control of the control unit.

12. A method of controlling a rear view camera for a vehicle, the method comprising:
transmitting, by a smart key possessed by a user who approaches a vehicle, an approach signal to a control unit provided inside the vehicle;
receiving, by the control unit, the approach signal;
after the receiving of the approach signal transmitted by the smart key, applying a current to a transparent conductor attached to a rear surface of an outer cover under control of the control unit;
detecting a user's touch on an outer cover that is provided to be exposed to the outside of the vehicle, the outer cover including a through-hole through which a camera is configured to photograph a rear region behind the vehicle;
in response to the detecting of the user's touch, generating, by a printed circuit board, an electrical signal under control of the control unit; and
opening a trunk of the vehicle in response to the electrical signal, and
the method further comprising:
after the detecting of the user's touch on the outer cover in a hollow type that is provided to be exposed to the outside of the vehicle,
in response to no longer detecting the user's touch, determining whether an ignition of the vehicle is turned on; and
in response to determining the ignition of the vehicle is turned on, stopping, by the printed circuit board, the applying of the current to the transparent conductor under control of the control unit,
wherein the outer cover is coupled to a protective cover configured to surround at least a portion of the camera configured to photograph the rear region behind the vehicle.

* * * * *